US011167970B2

(12) United States Patent
Siemens

(10) Patent No.: US 11,167,970 B2
(45) Date of Patent: Nov. 9, 2021

(54) SPINDLE-SHAFT UNIT FOR A DEVICE FOR THE ROTARY CLOSING OF CONTAINERS WITH A SCREW CLOSURE

(71) Applicant: KHS GmbH, Dortmund (DE)

(72) Inventor: Viktor Siemens, Rheinböllen (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/954,010

(22) PCT Filed: Sep. 6, 2018

(86) PCT No.: PCT/EP2018/073919
§ 371 (c)(1),
(2) Date: Jun. 15, 2020

(87) PCT Pub. No.: WO2019/120647
PCT Pub. Date: Jun. 27, 2019

(65) Prior Publication Data
US 2020/0391988 A1    Dec. 17, 2020

(30) Foreign Application Priority Data
Dec. 20, 2017    (DE) ...................... 10 2017 130 770.2

(51) Int. Cl.
*B31B 70/00*    (2017.01)
*B31B 70/20*    (2017.01)
(Continued)

(52) U.S. Cl.
CPC .......... *B67B 3/2066* (2013.01); *B67B 3/2033* (2013.01); *B65B 7/2835* (2013.01); *B67B 2201/08* (2013.01); *F16C 31/00* (2013.01)

(58) Field of Classification Search
CPC ........... B67B 3/00; B67B 3/20; B67B 3/2066; B67B 3/2033; B67B 3/28; B67B 3/286;
(Continued)

(56) References Cited

U.S. PATENT DOCUMENTS 5,687,552 A * 11/1997 Barca ...................... B67B 3/206
                                                53/306
6,777,834 B2 * 8/2004 Wittenstein .......... B23Q 1/4876
                                                310/12.19

(Continued)

FOREIGN PATENT DOCUMENTS

CN    1960936 A    5/2007
CN    101157433 A    4/2008
(Continued)

*Primary Examiner* — Valentin Neacsu
*Assistant Examiner* — Jacob A Smith
(74) *Attorney, Agent, or Firm* — Occhiuti & Rohlicek LLP

(57) ABSTRACT

A spindle-shaft unit for closing containers with a screw closure includes a spindle that is rotatable and axially movable relative to a housing and a bearing unit arranged between the housing and the spindle. The bearing unit comprises a sliding bearing that interacts with the spindle and a further bearing that interacts with the sliding bearing. The spindle is arranged at the sliding bearing such as to be displaceable and non-rotatable relative to the sliding bearing. The further bearing secures the sliding bearing so as to be rotatable and non-displaceable relative to the housing.

19 Claims, 5 Drawing Sheets

(51) Int. Cl.
*B31B 70/74* (2017.01)
*B67B 3/20* (2006.01)
*B65B 7/28* (2006.01)
*F16C 31/00* (2006.01)

(58) Field of Classification Search
CPC ..... B67B 7/28; B67B 7/2835; B67B 2201/08; F16C 31/00; H02K 7/08
USPC ................. 53/285, 287, 329, 331.5
See application file for complete search history.

(56) References Cited

U.S. PATENT DOCUMENTS

| | | | | |
|---|---|---|---|---|
| 7,533,590 | B2* | 5/2009 | Cirio | B67B 3/18 53/287 |
| 8,220,225 | B1* | 7/2012 | Zemlin | B67B 3/2066 53/331.5 |
| 10,807,744 | B1* | 10/2020 | Seiver | B67B 3/28 |
| 2006/0242929 | A1* | 11/2006 | Servadei | B67B 3/208 53/490 |
| 2007/0084151 | A1* | 4/2007 | Brown | B67B 3/2066 53/490 |
| 2008/0127611 | A1* | 6/2008 | Brown | B67B 3/2066 53/317 |
| 2009/0193759 | A1* | 8/2009 | Ueda | B67B 3/2033 53/331.5 |
| 2009/0247959 | A1* | 10/2009 | Kohlbrenner | A61M 5/24 604/232 |
| 2010/0032910 | A1* | 2/2010 | Feldmeier | B23B 31/261 279/140 |
| 2010/0077706 | A1* | 4/2010 | Cirio | B67B 3/2033 53/490 |
| 2010/0095636 | A1* | 4/2010 | Cirio | B67B 3/2066 53/331.5 |
| 2010/0212259 | A1* | 8/2010 | Knieling | B67B 3/2086 53/285 |
| 2011/0131923 | A1* | 6/2011 | Schonfelder | B67B 3/28 53/287 |
| 2012/0017539 | A1* | 1/2012 | Neufeld | H02K 16/00 53/285 |
| 2014/0300253 | A1* | 10/2014 | Rapp | H02K 7/102 310/68 B |
| 2015/0375980 | A1* | 12/2015 | Naaber | B67B 3/2033 53/317 |

FOREIGN PATENT DOCUMENTS

| | | |
|---|---|---|
| CN | 102123833 A | 7/2011 |
| CN | 203796755 U | 8/2014 |
| CN | 104150413 A | 11/2014 |
| CN | 205527950 U | 8/2016 |
| CN | 206369051 U | 8/2017 |
| DE | 4419323 A1 | 12/1995 |
| DE | 10056990 A1 | 5/2002 |
| DE | 102008037707 A1 | 2/2010 |
| JP | 2001019090 A | 1/2001 |
| JP | 4-258893 B2 | 4/2009 |
| WO | 2010/017800 A1 | 2/2010 |

\* cited by examiner

SPINDLE-SHAFT UNIT FOR A DEVICE FOR THE ROTARY CLOSING OF CONTAINERS WITH A SCREW CLOSURE

RELATED APPLICATIONS

This is the national stage of PCT/EP2018/073919, filed on Sep. 6, 2018, which claims the benefit of the Dec. 20, 2017 priority date of German application DE 102017130770.2, the contents of which are herein incorporated by reference.

FIELD OF INVENTION

The invention relates to container processing and in particular, to closing containers with a screw closure.

BACKGROUND

Known closing methods of closing a container require rotational and axial movement. This is carried out with a closure head at a distal end of a shaft.

To permit such movement, the shaft is typically secured to a housing component in a sliding bearing with a bushing.

The simultaneous stroke and rotation of the shaft in the region of the bushing leads to heavy wear on the bushing. This results in improper closure and operational stoppages due to defects. This results in high downtime and personnel costs involved in the repair.

SUMMARY

An object of the invention is that of providing a spindle-shaft unit for a machine that closes containers with screw closures and that does so with precision and with low wear even after extended operation thereof.

In one aspect, the invention features a spindle-shaft unit for closing containers with a screw closure. The spindle-shaft unit includes a spindle that is rotatable and axially movable relative to a housing and a bearing unit arranged between the housing and the spindle. The bearing unit comprises a sliding bearing that interacts with the spindle and a further bearing that interacts with the sliding bearing. The spindle is arranged at the sliding bearing such as to be displaceable and non-rotatable relative to the sliding bearing. The further bearing secures the sliding bearing so as to be rotatable and non-displaceable relative to the housing.

In another aspect, a spindle-shaft unit for the rotary closing of containers with a screw closure comprises a housing and a spindle arranged such as to be able to be rotated and displaced on the housing. A bearing unit arranged between the housing and the spindle comprises a sliding bearing that interacts with the spindle, and a further bearing that interacts with the sliding bearing. The spindle is arranged at the sliding bearing in such a way as to be longitudinally displaceable and non-rotatable. The sliding bearing rotates in relation to the housing component and is secured by the further bearing so as to be non-displaceable.

The bearing unit divides the simultaneous stroke and rotation movement. The sliding bearing carries out the stroke and the further bearing carries out the rotation. As a result, the overall load is divided between the sliding bearing and the further bearing. Since rotation in the sliding bearing causes considerable wear, dividing the overall load in this way reduces wear considerably. The result is a noticeable reduction and wear and a concomitant increase in both the service life of the bearing unit and the precision with which movements can be carried out.

Additionally, this configuration makes it possible to have the various substances that come into contact with the sliding bearing avoid coming into contact with the further bearing. These substances include various cleaning foams and other corrosive fluids. Again, this tends to increase the bearing unit's service life.

In some embodiments, a device for the rotary closing of containers with a screw closure comprises several spindle-shaft units arranged above respective housing components on a rotating carousel. In such embodiments, it is preferable for the arrangement on the carousel to be above the housing component. Among these are embodiments in which all the spindle-shaft units are arranged on the carousel at the same distance from one another. The device is preferably a screw cap closure device for containers, and in particular, for beverage bottles.

A spindle-shaft unit for the rotary closing of containers is understood to mean any structural unit that comprises a spindle, or shaft, that is rotatable as well as displaceable along its middle longitudinal axis and that is suitable for closing a screw closure, in particular, using a closure head arranged on a shaft.

The container is any container that can be closed by a screw closure. The container can be made of any desired material or any desired combination of several materials. For example, the container can be a bottle, a can, a canister, a tube, a box, a pouch, a composite cardboard box, a glass, a barrel, or the like. In a preferred embodiment, the container is for storing of foodstuffs. Preferably, the container is a bottle made of glass or a plastic, such as PE, PP or PET.

The housing is a component, a component group, or a module that surrounds the spindle at least in sections and preferably on all sides to separate the shaft, which is rotating and carrying out a stroke movement, from the surrounding environment. The housing component can be formed from any desired material. Preferably, the housing component can be formed from plastic or metal.

Another function of the housing component is to secure the spindle, as well as further components that may be arranged on it, to a closing machine.

In some embodiments, the housing is secured in a rotationally-resistant and/or non-displaceable manner to the closing machine, and in particular to a carousel of the closing machine. Preferably, the spindle is arranged on at least one side, in particular on a side for the arrangement of a closure head, projecting out of and/or capable of being pushed out of the housing. In yet other embodiments, the end of spindle opposite the side for the arrangement of a closure head is also positioned such as to project and/or be capable of being pushed out of the housing.

Embodiments of a spindle include those that are made as a single-part and those that are made as a combination of parts. In either case, the spindle carries out a stroke and rotation movement in relation to the housing. In a preferred embodiment, the spindle is arranged such that it can be displaced or translated along its own axis.

It is particularly useful to secure the spindle to the housing in such a way that the spindle's only possible translation is along its axis while still enabling it to rotate about its axis. In this situation, the spindle can be connected to some means for transferring a rotational and/or stroke movement or can itself comprise means for producing a rotation movement and/or stroke movement.

The bearing unit can be any component part or component group or module for the displaceable and rotatable arrangement of the spindle on the housing. The bearing unit comprises at least one sliding bearing as well as at least one further bearing. The sliding bearing interacts with the spindle and in is arranged directly at the spindle. The further bearing interacts with the sliding bearing to secure the sliding bearing directly opposite the housing.

The spindle is either secured opposite the sliding bearing or guided inside the sliding bearing in such a way that, in relation to the sliding bearing, the spindle can do little more than carry out a stroke movement along the middle longitudinal axis. In some embodiments, the sliding bearing is arranged in relation to the spindle such that it can initially be rotated very slowly. But the main rotation is taken over by the rotation bearing. The spindle is therefore arranged so as to be essentially rotation-free in relation to the sliding bearing, or, respectively, the sliding bearing carries out all the main rotation movements in common with the spindle. The sliding bearing is mounted such as to be rotatable in the further bearing.

Conversely, the further bearing prevents translation or stroke movements in the direction of spindle's axis such that a precise guiding is achieved of the spindle in an arrangement of a sliding bearing inside a rotation bearing. Precision is attained by the reduced wear caused by constant running in the sliding bushing. The further bearing can be any desired bearing, which is suitable for carrying out a rotation movement and prevents a translation movement.

According to a preferred further embodiment of the spindle-shaft unit, the sliding bearing comprises a sliding bushing. Among these are embodiments in which it is a sliding bearing bushing, those in which it is a composite bushing, and those in which it is formed from such bushing. The result in either case is a particularly simple and economical bearing arrangement of the spindle for attaining precise stroke movement.

In some embodiments, the sliding bearing is preferably formed from a plastic. In others, it is formed from a composite material comprising plastic. In still other embodiments, the sliding bearing is formed from metal, such as from sintered bronze.

In some embodiments, the sliding bushing is cylindrical. Among these are embodiments in which the sliding bushing's axial length between half and twice the cylinder's radius. Also among these embodiments are those in which the length approximates the radius.

In some embodiments, the sliding bushing is a composite bushing that has a composite body that projects at right angles. Among there are embodiments in which the sliding bushing extends over the sliding bushing's entire circumference. Also among these are embodiments in which the sliding bushing or composite bushing is configured as one piece.

Some embodiments feature a ring at the sliding bushing. To secure it against rotation relative to the spindle, the ring has at least one side guide, such as a slot or a nose. The ring's side guide interacts with a corresponding side guide on the spindle. This is either a nose or a slot depending on that of the ring. The resulting interlocking side guides result in a rotationally-resistant arrangement of the spindle in the sliding bushing.

In some embodiments, the side guide extends as far as the spindle's maximum possible stroke distance. In particular, the side guides of both the ring and spindle are formed to engage in a positive fit with each other. As such, they prevent translation movement in two spatial directions and/or a rotational movement in any spatial direction.

In some embodiments, the interaction of the side guides constrains the spindle so that it only moves along its axis. The ring is preferably secured to the sliding bushing.

Embodiments include those in which the connection between them is a positive fit, those in which it is a non-positive fir, those in which it is a bonded connection, and those in which it is a combination of the foregoing. In some embodiments, the sliding bushing is a composite bushing.

Some embodiments feature two side guides arranged on opposite sides of the spindle. Among these are embodiments in which the side guides include noses and slots that are configured to engage with each other. In some of these embodiments, the ring comprises two corresponding side guides, in particular slots or noses.

The side guide elements preferably extend parallel to the middle longitudinal axis of the spindle. This results in a simple and reliable way to guide and secure the ring and the sliding bearing against rotation in relation to the spindle. To promote this function, it is useful to arrange the side guides offset against one another by 180° along the circumference.

In a further embodiment, the arrangement for securing against rotation is directly between the composite bushing and the spindle. In this embodiment, noses that have been cast to point inwards on the bushing to engage in slots are introduced into the spindle.

In other embodiments, the side guides include slots and noses that are configured to mate with each other. Among these are embodiments in which both have a rectangular cross-section. Also among these are embodiments in which the slot and the nose have a consistent width and/or height and depth over their entire lengths. In such embodiments, the extent to which a nose projects corresponds to the slot's depth.

In still other embodiments, side guides are arranged along the ring's inner diameter and the spindle's outer diameter.

In yet other embodiments, the slot and the nose are arranged at right angles to the spindle's axis and extend radially. Among these are embodiments in which the nose and slot have the same width. It is particularly useful if all slots and noses have the same dimensions so that nose fits into a corresponding slot securely.

In some embodiments, the ring is formed from two parts that surround the spindle, with each part extending for half of the circumference. Preferably, these two parts can be secured to one another, in positive fit or in a non-positive fit, to form a ring that encloses the entire circumference. This makes it easier to assemble the ring with the side guide can be achieved.

In an alternative embodiment, the securing of the two parts of a ring can also be carried out by non-positive fit and/or bonded connection.

Also among these embodiments are those in which each part of the ring comprises a side guide, such as a nose or a slot.

In yet other embodiments, the sliding bushing is arranged such as to be able to rotate on the housing using a bearing. Among these are embodiments in which the bearing is a ball bearing and other embodiments in which it is a rolling bearing or a roller bearing. In these embodiments, the bearing contacts an outer ring at the housing and an inner ring at the sliding bushing. Generally speaking, therefore, the further bearing accommodates radial load.

Among these embodiments are those in which the bearing is ball bearing or a rolling bearing in a lubricant-free and non-rusting such as a plastic or steel balls or roller bodies, and, in particular, a VA balls or a VA roller body. The balls are arranged between the outer ring and inner ring.

In some embodiments, the sliding bearing is formed from two sliding bushings arranged above one another along the course of the spindle. Among these are embodiments in which a ring connects these sliding bushings to each other.

In some embodiments, the two sliding bushings are arranged such as to be rotatable on the housing, for example using a bearing, and in particular a ball bearing or roller bearing. Such an arrangement further eases the stress on the individual sliding bearings and other bearings.

In yet other embodiments, a collar connects the two sliding bushings to the ring so that both sliding bushings and the ring form a unit. As a result, the sliding bushings and ring cannot rotate in relation to one another.

In some embodiments, the sliding bearings are aligned with the collar sides facing one another. In such embodiments, the collar holds or clamps the sliding bearings between the rotation bearings. This arrangement prevents the sliding bushing from becoming unseated in the rotation bearing's inner ring.

In some embodiments, the housing features a borehole. The borehole is concentric to the spindle such that the borehole's midpoint aligns with the spindle's axis.

Preferably, a closure ring closes this borehole in the direction that faces the closure head. The closure ring is formed and arranged in such a way as to achieve a secure seating of the further bearing and preferably also of the sliding bearing.

In such embodiments, one or more bearings are arranged in this borehole. This arrangement makes it simple to replace the bearing's various components.

Some embodiments avoid having direct contact between the closure ring and the spindle and/or the sliding bearing, and in particular the sliding bushing. Among these are embodiments in which screws secure the closure ring to the housing.

In a preferred embodiment, a closure head arranged at the spindle grasps a screw closure and rotates it onto a container to close it. The spindle both rotates this closure head and moves it axially.

Yet other embodiments feature a toothed wheel that is used to enable the spindle to be driven to rotate. The toothed wheel is secured to the spindle, preferably at a side opposite the closure head in relation to the sliding bearing or the spindle-shaft unit, respectively. The toothed wheel preferably projects at least in sections out of the housing. Alternatively, an opening in the housing provides access to the toothed wheel. Preferably, the toothed wheel preferably surrounds the spindle on all sides or over its entire circumference.

In some embodiments, the toothed wheel is a straight-toothed toothed wheel. In other embodiments, the tooth arrangement runs along the spindle's axis.

In yet other embodiments, the toothed wheel is longer along the middle longitudinal axis than the maximum possible displacement of the spindle in this direction in relation to the housing. Among these are embodiments in which it is at least 20% longer. Also among these are embodiments in which it is between 120% and 200% of the maximum possible displacement.

In some embodiments, a second sliding bearing is arranged at the spindle. Among these are embodiments in which the spindle is formed from two sections that are arranged in contact with one another. In such embodiments, the first section carries a closure head and interacts with the second sliding bearing. The second section interacts with the second sliding bearing.

Among these embodiments are those in which a spindle guide arranged at the second section controls the spindle's axial displacement. In some of these embodiments, the second sliding bearing is arranged on a side opposite the closure head in relation to the spindle-shaft unit, such as on a side opposite the spindle-shaft unit in relation to the toothed wheel.

In some embodiments, a spindle bearing connects two sections of the spindle to each other. This spindle bearing is between the second sliding bearing and the toothed wheel, which is preferably formed as a ball bearing or rolling bearing. The configuration enables rotation and axial displacement of the first section. However, it decouples the second section from rotation so that the latter can only be axially displaced.

In a preferred embodiment, a second section of the spindle interacts with a running wheel, which is part of a spindle guide. The running wheel rolls on a control curve so as to control the spindle's stroke. The wheel's rotation axis of is arranged at right angles to spindle's axial stroke.

BRIEF DESCRIPTION OF THE DRAWINGS

These and other features of the invention will be apparent from the following detailed description and the accompanying figures, in which.

DETAILED DESCRIPTION

Figure 1A:
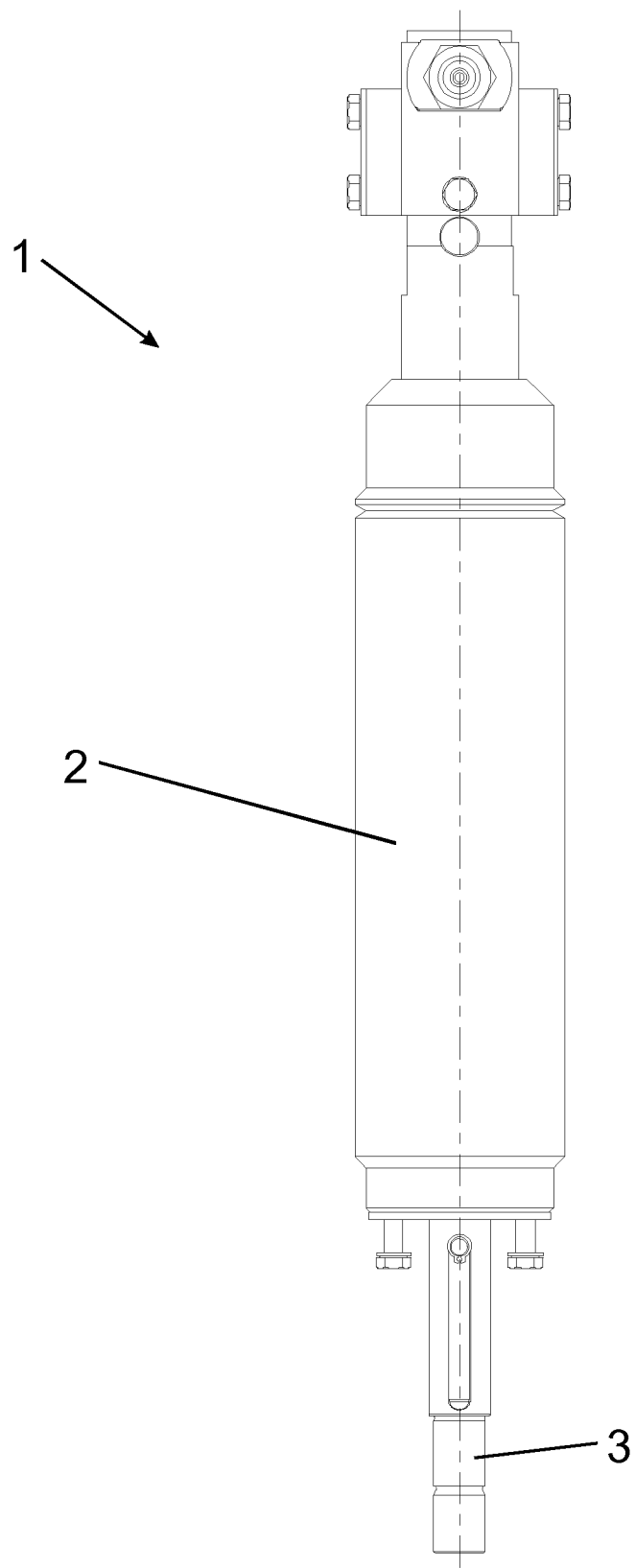
FIG. 1a shows a side view of a device for rotary closing.

As shown in FIG. 1a, a spindle-shaft unit 1 for rotary closing of containers with a screw closure includes a spindle 3 that is movable along a middle longitudinal axis and also rotatable about that axis. The spindle 3 is arranged inside a housing 2 in such a way that its distal end projects beyond a distal end of the housing 2.

Figure 1B:
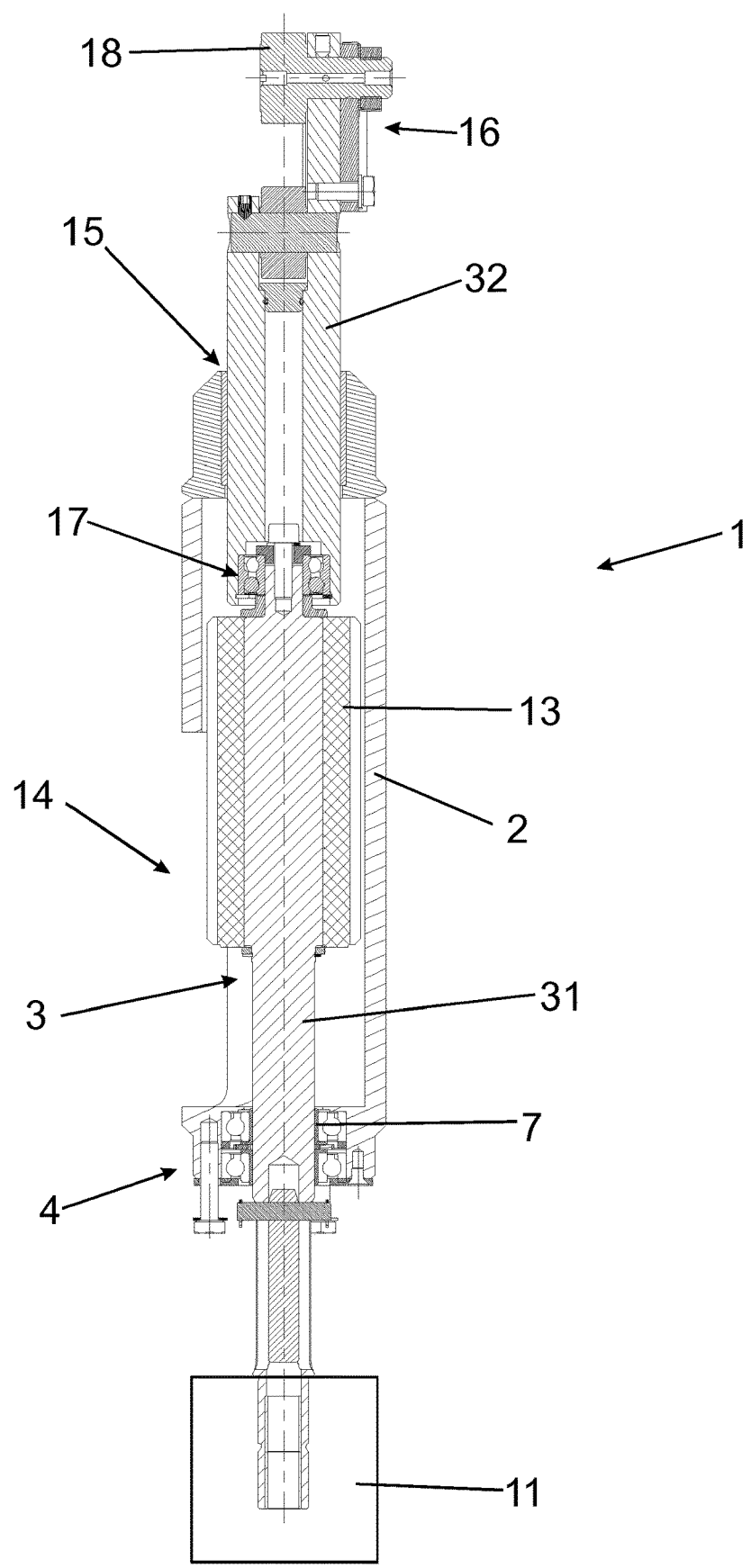
FIG. 1b is a sectional drawing through a middle longitudinal axis of the device represented in FIG. 1a, FIG. 2 is an enlarged sectional view of a spindle of the device represented in FIG. 1.

Referring now to FIG. 1b, the spindle 3 comprises a distal section 31 and a proximal section 32, both of which are coaxial with a middle longitudinal axis. A rotation bearing 17 connects the proximal section 32 to the distal section 31. As a result of the rotation bearing 17, the distal section 31 and the proximal section 32 rotate independently of each other. In a typical embodiment, the rotation bearing 17 is a roller bearing.

A closure head 11 arranged at the distal end of the distal section 31 projects out of the housing 2. This closure head 11 engages a screw cover that is to be screwed onto a screw thread of a container.

A toothed wheel 13 having straight teeth surrounds the spindle's distal section 31 in the region of the rotation bearing 17. The toothed wheel 13 extends along the spindle 3 to an extent that corresponds to about 120% of the shaft's maximum axial displacement relative to the housing 2.

An opening 14 in the housing 2, which is also in the region of the toothed wheel 13, extends along the housing's length such that, no matter how much the spindle 3 is displaced, at least some part of the toothed wheel 13 is accessible through the opening 14. This makes it possible to drive the distal section's rotation using a further toothed wheel that interacts with the toothed wheel 13 through the opening 14.

The proximal section 32 connects via the rotation bearing 17 to the distal section 31. At its opposite end, the proximal section 32 comprises a guide 16 that controls the shaft's linear displacement. A sliding bearing 15 secured to the housing 2 permits the proximal section 32 to slide up and down. In a typical embodiment, the sliding bearing 15 is a plastic sliding bushing.

The guide 16 comprises a running wheel 18 whose rotation axis is perpendicular to the middle longitudinal axis. The running wheel 18 rolls along a control curve that runs up and down. As a result, the running wheel's movement along the control curve causes the proximal section 32, and hence the spindle 3, to move up and down in a corresponding manner. The proximal section 32 only carries out a stroke movement. It does not rotate.

A bearing unit 4 secures the distal section 31 to the housing 2 in such a way as to permit the distal section 31 to both rotate and to move axially.

Within the bearing unit, a pair of plastic collar bushings 7a, 7b that are stacked on above one another along the distal section 31 forms a sliding bearing 5a, 5b that guides the distal section 31 as it slides past. A collar 19 connects the collar bushings 7a, 7b to a ring 20 arranged between the two collar bushings 7a, 7b. This prevents the collar bushings 7a, 7b from rotating with the distal section 31 of the spindle 3.

Figure 3A:
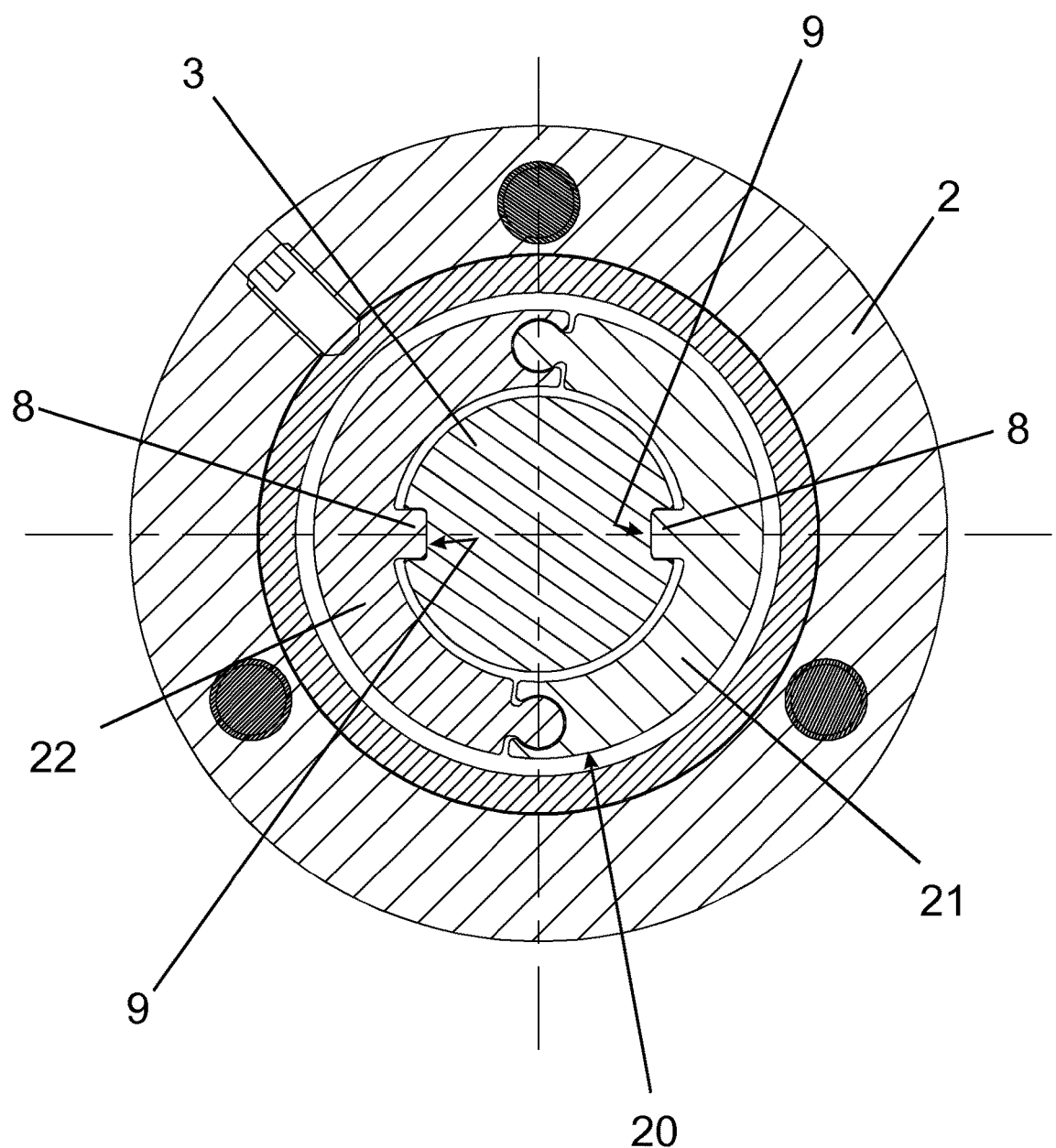
FIG. 3a is a sectional view along the middle longitudinal axis of the spindle shown in FIG. 2, at the level of a ring arranged between two collar sleeves.

Referring now to FIG. 3a, the ring 20 comprises two rectangular noses 8 arranged on opposing sides of the ring's interior. These noses 8 engage corresponding slots 9 on the spindle's surface in such a way as to permit the ring 20 to be displaced along the middle longitudinal axis but without rotating about the spindle 3. The ring 20 thus provides a way to secure the collar bushings 7a, 7b to the spindle 3 without having them rotate. The slots 9 extend parallel to the middle longitudinal axis of the spindle 3 over a length that is at least enough to accommodate the maximum linear displacement of the spindle 3 relative to the housing 2.

To promote ease of installation, and in particular, insertion of the noses 8 into the slots 9, it is useful to form the ring 21 from equal-sized ring parts 21, 22 that together surround the spindle's entire circumference. The ring parts 21, 22 engage each other in either a positive fit or a non-positive fit.

Figure 2:
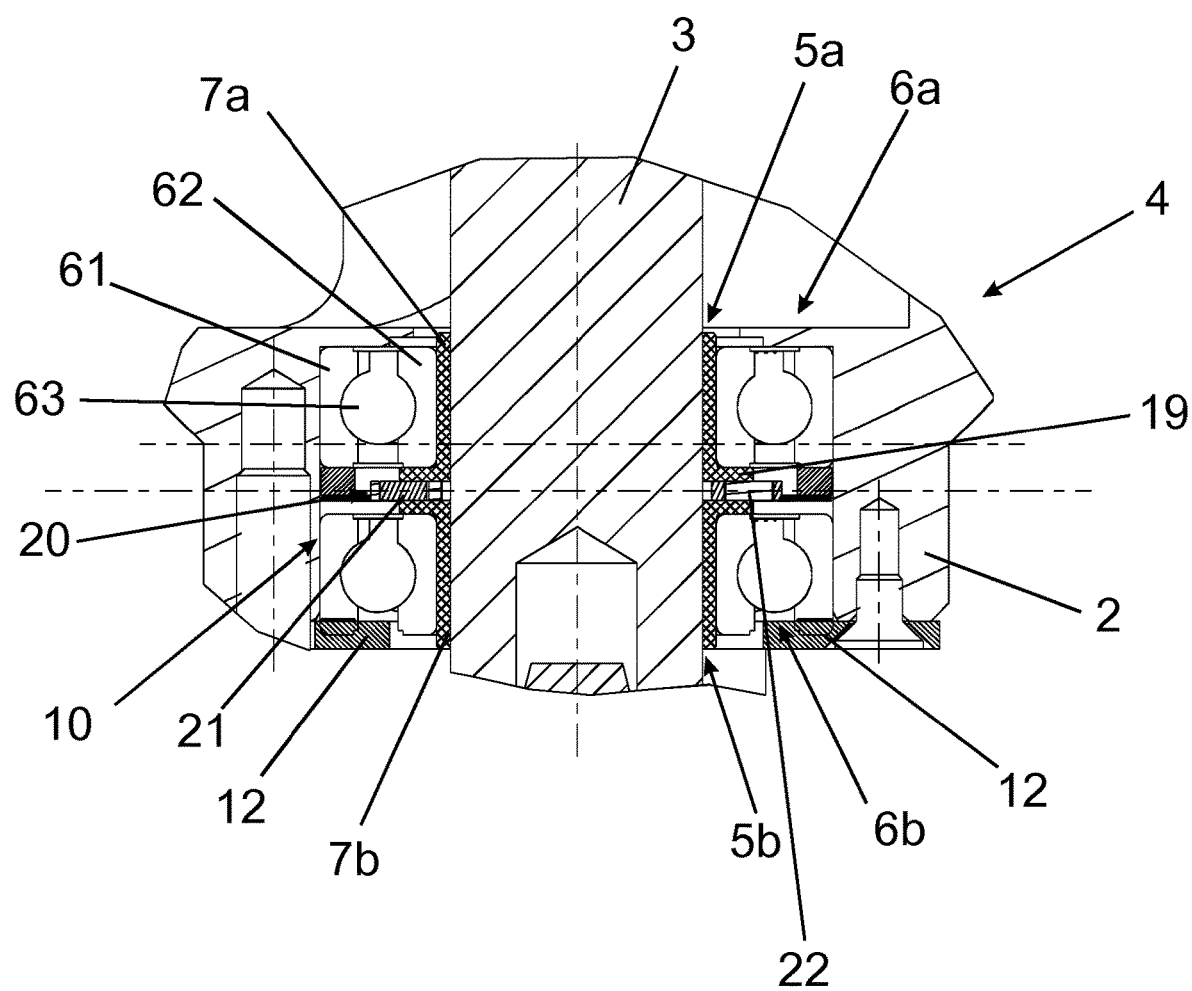
Figure 3B:
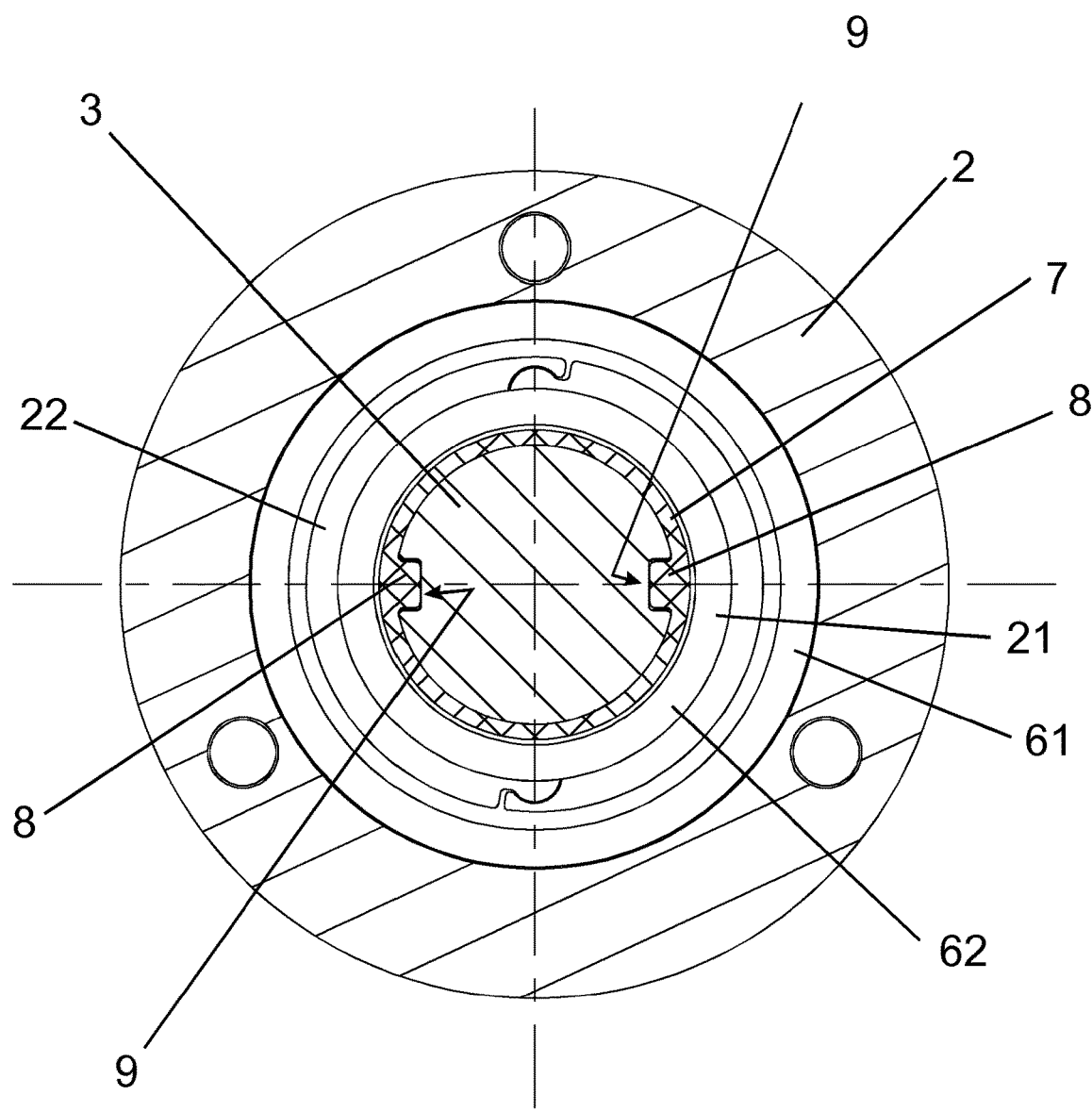
FIG. 3b is a sectional view along the middle longitudinal axis of the spindle-shaft unit represented in FIG. 3a, at the level of an inner and outer ring of a rolling bearing.

The bearing unit 4 also features roller bearings 6a, 6b to permit the spindle's distal section 31 to rotate relative to the housing 2. Referring back to FIG. 2, each roller bearing 6a, 6b corresponds to one of the collar bushings 7a, 7b. In particular, each roller bearing 6a, 6b features an inner ring 62 that is arranged at a corresponding one of the collar bushings 7a, 7b. Each roller bearing 6a, 6b also features an outer ring 61 that is arranged against the housing 3, as shown in FIG. 3B. The roller bearing's balls 63, which can be seen in FIG. 2, are disposed between the inner and outer rings 62, 61. As a result, only a rotation within it of the collar bushings 7a, 7b is possible in common with the spindle 3 about the middle longitudinal axis. There is no displacement along the middle longitudinal axis.

A bore hole 10 in the housing 2 provides a place to secure the bearing unit 4 in a positive fit. Preferably, the hole 10 is on a side of the housing 2 that faces the closure head 11. A closure ring screwed to the housing 2 in a region of the opening secures the bearing unit 4, and in particular, the rolling bearing 6a, 6b, against slipping out of the borehole 10. The resulting bearing arrangement thus permits rotation and sliding in a way that avoids excessive wear.

Having described the invention and a preferred embodiment thereof, what is claimed as new and secured by Letters Patent is:

1. An apparatus comprising a spindle-shaft unit for dosing a container with a screw closure, said spindle-shaft unit comprising a housing, a spindle that is rotatable and axially movable relative to said housing, and a bearing unit that is arranged between said housing, and said spindle, wherein said bearing unit comprises a sliding bearing that interacts with said spindle and a further hearing that interacts with said sliding bearing, wherein said spindle is arranged at said sliding bearing such as to be displaceable and non-rotatable relative to said sliding bearing, and wherein said further bearing secures said sliding bearing so as to be rotatable and non-displaceable relative to said housing, and wherein said sliding bearing comprises a sliding bushing, wherein said apparatus further comprises a ring, wherein said ring comprises a side guide that is secured to said sliding bushing, wherein said side guide interacts with a corresponding side guide of said spindle, wherein, as a result of said interaction, said sliding bushing is secured against rotation relative to said spindle, and wherein said side guide is selected from the group consisting of a slot and a nose.

2. The apparatus of claim 1, wherein said sliding bearing comprises a sliding bushing.

3. The apparatus of claim 1, wherein said sliding bearing comprises a collar bushing.

4. The apparatus of claim 1, further comprising a ring, wherein said spindle comprises side guides opposite one another, wherein said ring comprises corresponding side guides opposite each other, wherein said side guides are selected from the group consisting of noses and slots, and wherein said side guides are selected such that side guides of said ring engage said side guides of said spindle.

5. The apparatus of claim 1, wherein said spindle has a circumference, wherein said apparatus further comprises first and second parts that engage each other to form a ring, and wherein each of said first and second parts surrounds half of said circumference.

6. The apparatus of claim 1, wherein said sliding bearing comprises a sliding bushing, wherein said apparatus further comprises an outer ring, an inner ring, and a ball bearing, wherein said ball bearing contacts said outer ring at said housing and contacts said inner ring at said sliding bushing, and wherein said sliding bushing is configured to be rotated by means of said ball bearing.

7. The apparatus of claim 1, further comprising a ring, wherein said sliding bearing comprises a first sliding bushing and a second sliding bushing that is disposed above said first sliding bushing, and wherein said ring conjoins said first and second sliding bushings.

8. The apparatus of claim 1, further comprising a borehole, a closure head, and a closure ring, wherein said closure head is arranged on said spindle, wherein said further bearing is arranged in said borehole, wherein said borehole is a hole of said housing, and wherein said closure ring closes said borehole is in a direction towards said closure head.

9. The apparatus of claim 1, further comprising a closure head disposed on said spindle, wherein said spindle rotates and axially displaces said spindle.

10. The apparatus of claim 1, further comprising a toothed wheel that is secured to said spindle to enable said spindle to be driven to rotate, wherein at least a section of said toothed wheel projects out of said housing.

11. The apparatus of claim 1, wherein said housing comprises an opening, wherein said apparatus further comprises a toothed wheel that is secured to said spindle enabling said spindle to be driven to rotate, and wherein at least a section of said toothed wheel is accessible through said opening.

12. The apparatus of claim 1, wherein said sliding bearing is a first sliding bearing, wherein said apparatus further comprises a spindle guide, a second sliding bearing, and a closing head, wherein said second sliding bearing is arranged at said spindle, wherein said spindle comprises a distal section and a proximal section, wherein said distal section interacts with said first sliding bearing, wherein said closure head is disposed at said distal section, and wherein said spindle guide controls axial displacement of said spindle.

13. The apparatus of claim 1, further comprising a toothed wheel, a second sliding bearing, and a spindle bearing, wherein said sliding bearing is a first sliding bearing, wherein said spindle comprises a distal section and a proximal section, wherein said spindle bearing connects said distal section to said proximal section, and wherein said spindle bearing is arranged between said second sliding bearing and said toothed wheel, and wherein said spindle bearing is a ball bearing.

14. The apparatus of claim 1, further comprising a toothed wheel, a second sliding bearing, and a spindle bearing, wherein said sliding bearing is a first sliding bearing, wherein said spindle comprises a distal section and a proximal section, wherein said spindle bearing connects said distal section to said proximal section, and wherein said spindle bearing is arranged between said second sliding bearing and said toothed wheel, and wherein said spindle bearing is a roller bearing.

15. The apparatus of claim 1, wherein said sliding bearing is a first sliding bearing, wherein said apparatus further comprises a spindle guide, a control curve, and a second sliding bearing, wherein said spindle comprises a distal section and a proximal section, wherein said spindle guide comprises a running wheel, and wherein said running wheel rolls along said control curve for controlling a stroke of said spindle.

16. The apparatus of claim 1, wherein said spindle comprises a distal section and a proximal section, wherein said apparatus further comprises a spindle-shaft bearing that connects said distal and proximal sections, thereby permitting said distal section and said proximal section rotate independently of each other.

17. The apparatus of claim 1, wherein said spindle comprises a distal section and a proximal section, wherein said apparatus further comprises an additional sliding bearing that interacts with a proximal section of said spindle.

18. The apparatus of claim 1, further comprising a closure head and a spindle-shaft guide, wherein said shaft comprises a proximal section and a distal section, wherein said distal section is connected to said closure head, and wherein said spindle-shaft guide is arranged at said proximal section of said shaft for controlling displacement of said shaft.

19. The apparatus of claim 1, wherein said apparatus further comprises an additional sliding bearing, a closure head, and a toothed wheel, wherein said spindle comprises a distal section and a proximal section, wherein said additional sliding bearing interacts with said proximal section of said spindle, wherein said distal section connects to said closure head, and wherein said toothed wheel is between said second sliding bearing and said bearing unit.

\* \* \* \* \*